United States Patent
Hansen et al.

(10) Patent No.: US 11,845,013 B2
(45) Date of Patent: Dec. 19, 2023

(54) WHEEL FOR A TOY VEHICLE AND A TOY VEHICLE WITH WHEELS

(71) Applicant: LEGO A/S, Billund (DK)

(72) Inventors: Jørn Skovløber Hansen, Billund (DK); Carl Edward Loader, Hasselager (DK)

(73) Assignee: LEGO A/S, Billund (DK)

( * ) Notice: Subject to any disclaimer, the term of this patent is extended or adjusted under 35 U.S.C. 154(b) by 210 days.

(21) Appl. No.: 17/611,469

(22) PCT Filed: May 18, 2020

(86) PCT No.: PCT/EP2020/063776
§ 371 (c)(1),
(2) Date: Nov. 15, 2021

(87) PCT Pub. No.: WO2020/229697
PCT Pub. Date: Nov. 19, 2020

(65) Prior Publication Data
US 2022/0212116 A1 Jul. 7, 2022

(30) Foreign Application Priority Data
May 16, 2019 (DK) .............................. PA201970309

(51) Int. Cl.
*A63H 17/26* (2006.01)
*B60C 7/00* (2006.01)

(52) U.S. Cl.
CPC ............. *A63H 17/262* (2013.01); *B60C 7/00* (2013.01)

(58) Field of Classification Search
CPC ........ A63H 17/00; A63H 17/262; B60C 7/00; B60C 19/00
See application file for complete search history.

(56) References Cited

U.S. PATENT DOCUMENTS

| | | | |
|---|---|---|---|
| 2,665,521 A | 1/1954 | Ford | |
| 4,900,095 A * | 2/1990 | Brubaker | A63H 17/262 301/10.1 |
| 7,694,705 B2 * | 4/2010 | Yokobori | B60C 11/02 446/454 |

FOREIGN PATENT DOCUMENTS

| | | |
|---|---|---|
| GB | 1232308 A | 5/1971 |
| JP | S5285597 U | 6/1977 |
| JP | 2006055347 A | 3/2006 |

OTHER PUBLICATIONS

International Search Report issued in corresponding international patent application No. PCT/EP2020/063776, dated Sep. 8, 2020, 3 pages.

(Continued)

*Primary Examiner* — John A Ricci
(74) *Attorney, Agent, or Firm* — Day Pitney LLP; Anthony A. Kassas

(57) ABSTRACT

A wheel for a toy vehicle, the wheel comprising an axle hub defining a wheel axis of rotation and a rim with an inboard flange and an outboard flange each having an outer diameter. The wheel further comprises a primary tire forming the tread of the wheel with a tread diameter and a tread width. The primary tire is attached to the axle hub between the inboard and the outboard flange such that it rotates with the axle hub. The wheel further comprises an outboard slip ring rotatably mounted between the primary tire and the outboard flange so that the outboard slip ring can rotate with respect to the primary tire about the wheel axis of rotation. The outboard slip ring has an outer diameter smaller than the tread diameter and larger than the outer diameter of the outboard flange.

11 Claims, 2 Drawing Sheets

(56) References Cited

OTHER PUBLICATIONS

Written Opinion of the International Searching Authority issued in corresponding international patent application No. PCT/EP2020/063776, dated Sep. 8, 2020, 5 pages.

* cited by examiner

WHEEL FOR A TOY VEHICLE AND A TOY VEHICLE WITH WHEELS

CROSS-REFERENCE

This application is a U.S. national stage application under 35 U.S.C. 371 of co-pending International Application No. PCT/EP2020/063776 filed on May 18, 2020 and published as WO 2020/229697, which claims priority to DK Patent Application No. PA201970309 filed on May 16, 2019, the contents of which are incorporated by reference herein in their entirety for any purpose whatsoever.

BACKGROUND

The subject disclosure relates to wheels for toy vehicles as well as a toy vehicle with wheels.

Embodiments of wheels for toy vehicles are known in the art. Toy vehicles having a motor, such as an electric motor or a flywheel, for rotating the wheel pose a risk that the spinning wheel catches some hair, a finger or another body part of the child using the toy vehicle.

In this regard, JP patent application No. 2006055347 discloses an electric vehicle with wheels having a wheel cap 38 attached to the outside of the outer side wall of the wheel so that the child does not pinch fingers in a through-hole on the spinning wheel.

SUMMARY

Based on this, it is the object of the subject disclosure to provide a wheel for a toy vehicle and a toy vehicle with such a wheel, where the risk that the wheel may catch hair or pinch body parts of a child when it is spinning is significantly reduced.

According to the subject disclosure, this is achieved by having the wheel include an axle hub defining a wheel axis of rotation, a rim with an inboard flange and an outboard flange each having an outer diameter, a primary tire forming the tread of the wheel with a tread diameter and a tread width attached to the axle hub between the inboard and the outboard flange such that it rotates with the axle hub, and an outboard slip ring rotatably mounted between the primary tire and the outboard flange so that the outboard slip ring can rotate freely with respect to the primary tire and the axle hub about the wheel axis of rotation, the outboard slip ring having an outer diameter that is slightly smaller than the tread diameter and larger than the outer diameter of the outboard flange.

In a preferred embodiment, the wheel further comprises an inboard slip ring rotatably mounted between the primary tire and the inboard flange so that the inboard slip ring can rotate about the wheel axis with respect to the primary tire, the inboard slip ring having an outer diameter being slightly smaller than the tread diameter and larger than the outer diameter of the inboard flange.

The primary tire is preferably an annular ring made from a material softer than the material of the inboard and the outboard slip rings, and has an internal annular inner edge frictionally engaging with the axle hub.

In this regard, the tread of the primary tire may preferably have a higher friction than the surface at the outer diameter of the inboard and/or the outboard slip ring.

Furthermore, the distance between the outer diameter of the inboard slip ring and the outer diameter of outboard slip ring may preferably be equal to or larger than the tread width.

In a further preferred embodiment, the axle hub and the outboard flange are provided by a first wheel component and the inboard flange is provided by a second wheel component, wherein the second wheel component is permanently attached to the first wheel component by gluing, welding or the like.

In order to further reduce the risk that the wheel may catch hair of the child, the primary tire has an annular flange arranged on each side thereof, and the inboard slip ring and the outboard slip ring each have an annular groove arranged so that each of the annular flanges on the primary tire extends into an annular groove on the inboard slip ring and the outboard slip ring.

Furthermore, the width of both the inboard slip ring and the outboard slip ring, measured in a direction parallel to the wheel axis of rotation, may preferably be equal to or larger than the corresponding tread width of the primary tire.

The present invention also relates to a toy vehicle having at least one wheels as discussed herein. In this relation, the wheel is especially advantageous when mounted in wheel arches arranged in the vehicle body.

As mentioned in previously, the wheel is especially advantageous when the vehicle comprises a motor and a drivetrain with one or more final drive axles, and where at least one wheel is attached to one of the final drive axles.

DETAILED DESCRIPTION

Figure 1:
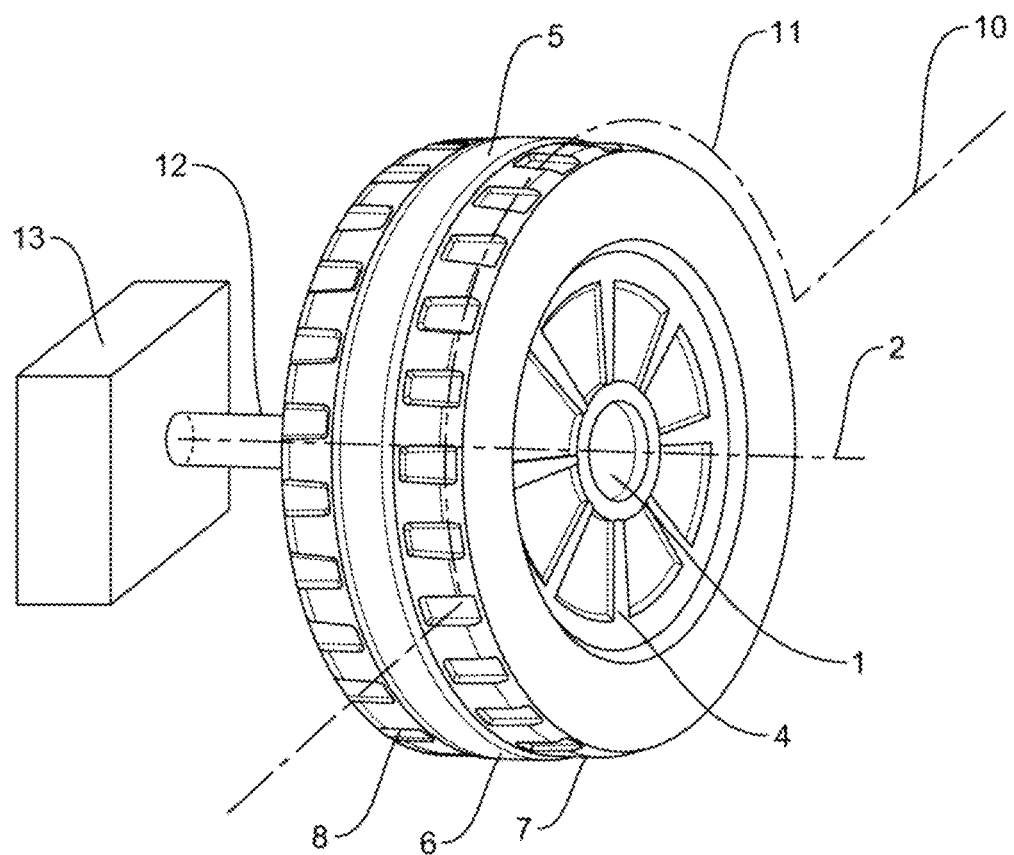
FIG. 1 is a perspective principle drawing showing a toy vehicle with a wheel according to the invention.

FIG. 1 shows in principle a toy vehicle with a wheel according to the subject disclosure. As will be appreciated by those of ordinary skill in the pertinent art, the wheel can be embodied in numerous different embodiments of toy vehicles. The toy vehicle is shown in part with dotted lines showing the outline of a part of the bottom 10 of the vehicle body having one wheel arch 11 arranged and a powertrain 13, 12 adapted for rotating the wheel. The powertrain 13, 12 may comprise any motor and suitable drive train for this purpose. The powertrain 13,12 is connected via the final drive axle 12 to the wheel so that it can rotate the wheel about the wheel axis of rotation 2, having an outboard flange 4 on the curbside of the vehicle and the inboard flange 9 on the vehicle side of the wheel.

Figure 2:
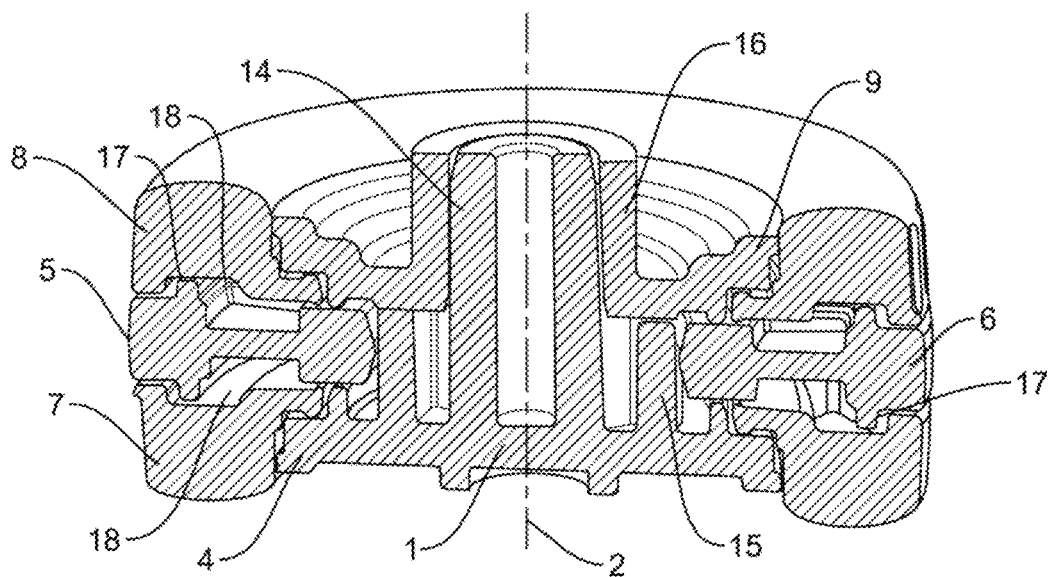
FIG. 2 is a perspective cross-sectional view of the wheel shown in FIG. 1.
Figure 3:
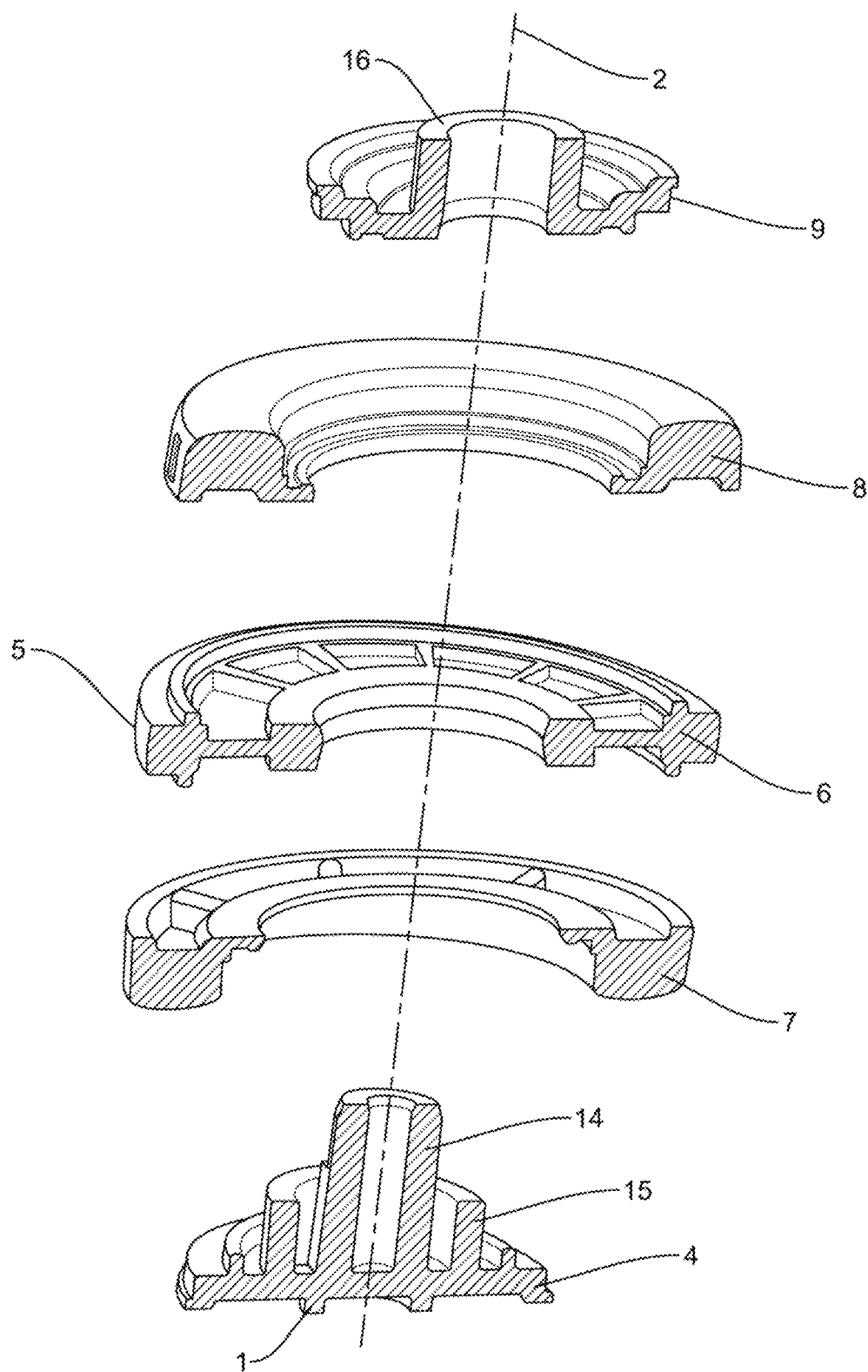
FIG. 3 is an exploded cross-sectional view of the wheel shown in FIG. 2.

In this embodiment of the invention, the wheel comprises several components as will be explained in more detail with reference to FIGS. 2 and 3, showing cross sectional views of the wheel in a perspective and exploded view respectively.

As shown in FIG. 2 the axle hub 1 and the outboard flange 4 are provided by a single component comprising an axle bushing 14 with a central axle bore extending along the wheel axis of rotation 2 allowing the final drive axle 12 in FIG. 1 to be fixed to the axle hub 1 in the axle bore. The axle hub 1 also comprises an annular spacer bushing 15 concentrically arranged about the axle bushing 14.

The inboard flange 9 is provided on a separate component having a support bushing 16 enabling the inboard flange 9 to be firmly attached to the outside of the axle bushing 14, for example by welding or gluing in a position where the support bushing 16 abuts the annular spacer bushing 15 so that the distance between the inboard flange 9 and the outboard flange 4 is exact.

According to this embodiment of the subject disclosure the primary tire 6 is arranged between the inboard flange 9 and the outboard flange 4 so that it forms a tread 5 on the outermost diameter of the wheel. The primary tire 6 thereby provides traction to the wheel as it is frictionally attached to the axle hub 1.

On the inboard side of the primary tire 6, an inboard slip ring 8 is arranged, and on the outboard side of the primary tire 6 an outboard slip ring 7 is arranged. The slip rings 7, 8 are arranged between the primaty tire 6 and the inboard and outboard flange 9, 4 respectively. The annular spacer bushing 15 provides a distance between the inboard flange 9 and the outboard flange 4 such that each of the slip rings 7, 8 can rotate freely about the wheel axis of rotation 2 with respect to the axle hub 1 as well as the primary tire 6. The slip rings 7, 8 are therefore unable to provide traction.

Even though the two slips rings 7, 8 and the primary tire 6 together resemble a complete tire tread of the wheel, it is only the primary tire 6 that provides traction to the wheel. The slip rings 7, 8 only rotate along with the primary tire as long as no obstructions hinder rotation. If an obstruction, for example, the hair or finger of a child, touches one or both of the slip rings 7, 8, then only the slip rings 7, 8 will stop rotating while the rest of the wheel, including the primary tire 6, continues to rotate.

The primary tire 6 is preferably made from a relatively elastic or soft plastic or rubber material, providing relatively high friction, while the slip rings 7, 8 are made from a relatively hard plastic material. If the width of the tread 5 of the primary tire 6, as measured in a direction parallel to the wheel axis of rotation 2, is equal to or smaller than the distance between the outer diameter of the two slip rings 7, 8, then the slip rings 7, 8 provide support for the primary tire 6 so that the correct position of the tread 5 is secured even when traction is applied to the wheel.

FIG. 3 shows the wheel of FIGS. 1 and 2. The wheel is assembled by positioning a first component comprising the axle hub 1 and the outboard flange 4, having the axle bushing 14 and the annular spacer bushing 15 pointing upwards. Then the outboard slip ring 7, the primary tire 6 and the inboard slip ring 8 are stacked upon the first component. A second component comprising the inboard flange 8 is attached to the axle bushing 14. The support bushing 16 is firmly attached to the axle bushing 14, for example by gluing or welding in the position as shown in FIG. 2. The inboard flange 9 rests on top of the annular spacer bushing 15 so that the primary tire 6 is locked between the outboard flange 4 and the inboard flange 9. However, the slip rings 7, 8 are still free to rotate with respect to the axle hub 1 and the primary tire 6.

From the description above, it will be appreciated by those of ordinary skill in the pertinent art that the subject disclosure may be implemented in many different embodiments apart from the embodiments shown in the figures and produced by a variety of materials, preferably plastic by injection molding or additive manufacturing.

The invention claimed is:

1. A wheel for a toy vehicle, the wheel comprising:
an axle hub defining a wheel axis of rotation;
a rim with an inboard flange and an outboard flange each having an outer diameter;
a primary tire forming a tread of the wheel with a tread diameter and a tread width, attached to the axle hub between the inboard and the outboard flange such that it rotates with the axle hub; and
an outboard slip ring rotatably mounted between the primary tire and the outboard flange so that the outboard slip ring can rotate with respect to the primary tire about the wheel axis of rotation, the outboard slip ring having an outer diameter that is smaller than the tread diameter and larger than the outer diameter of the outboard flange.

2. The wheel according to claim 1, further comprising an inboard slip ring rotatably mounted between the primary tire and the inboard flange so that the inboard slip ring can rotate about the wheel axis with respect to the primary tire, the inboard slip ring having an outer diameter that is smaller than the tread diameter and larger than the outer diameter of the inboard flange.

3. The wheel according to claim 2, wherein the primary tire is an annular ring made from a material softer than the material of the slip rings, and wherein the primary tire has an internal annular inner edge frictionally engaging with the axle hub.

4. The wheel according to claim 3, wherein the tread of the primary tire has a higher friction than the surface at the outer diameter of the inboard and/or the outboard slip ring.

5. The wheel according to claim 3, wherein the distance between the outer diameter of the inboard slip ring and the outer diameter of the outboard slip ring is equal to or larger than the tread width.

6. The wheel according to claim 5, wherein the primary tire has an annular flange arranged on each side thereof, and the inboard slip ring and the outboard slip ring each have an annular groove arranged so that each of the annular flanges on the primary tire extends into an annular groove on the inboard slip ring and the outboard slip ring.

7. The wheel according to claim 2, wherein a width, measured in a direction parallel to the wheel axis of rotation, of both the inboard slip ring and the outboard slip ring is equal to or larger than the corresponding tread width on the primary tire.

8. The wheel according to claim 1, wherein the axle hub and the outboard flange are provided by a first wheel component and the inboard flange is provided by a second wheel component, and wherein the second wheel component is permanently attached to the first wheel component.

9. A toy vehicle comprising the wheel according to claim 1.

10. The toy vehicle according to claim 9, wherein the toy vehicle comprises a body and the wheel is arranged in an arch within the body of the toy vehicle.

11. The toy vehicle according to claim 9, further comprising a motor and a drivetrain with one or more final drive axles, and wherein the wheel is attached to one of the final drive axles.

\* \* \* \* \*